(12) United States Patent
Fennell et al.

(10) Patent No.: US 9,218,387 B2
(45) Date of Patent: *Dec. 22, 2015

(54) CLOUD BASED MASTER DATA MANAGEMENT SYSTEM AND METHOD THEREFOR

(71) Applicant: Dell Products, LP, Round Rock, TX (US)

(72) Inventors: Eric G. Fennell, Lansdale, PA (US); James T. Ahlborn, Downingtown, PA (US)

(73) Assignee: Dell Products, LP, Round Rock, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/899,715

(22) Filed: May 22, 2013

(65) Prior Publication Data

US 2014/0351205 A1 Nov. 27, 2014

(51) Int. Cl.
*G06F 17/30* (2006.01)

(52) U.S. Cl.
CPC .... *G06F 17/30371* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 2004/0044689 A1* | 3/2004 | Krabel et al. | 707/104.1 |
| 2005/0187993 A1* | 8/2005 | Selman et al. | 707/204 |
| 2008/0270977 A1* | 10/2008 | Nucci et al. | 717/105 |
| 2008/0306973 A1* | 12/2008 | Richard | 707/100 |
| 2013/0238641 A1 | 9/2013 | Mandelstein et al. | |
| 2013/0275369 A1 | 10/2013 | Hajare et al. | |

* cited by examiner

*Primary Examiner* — Son T Hoang
(74) *Attorney, Agent, or Firm* — Larson Newman, LLP

(57) ABSTRACT

A source record from an enterprise is received at a registry at a master data management system at a host enterprise. The enterprise is located remotely from the host enterprise. The source record has a source identifier. A data record is generated based on the source record and the data record has a first registry identifier. The data record is stored at a data store. The registry maintains a link identifying a relationship between the registry identifier and the source identifier. A reference engine determines a value of an attribute of a field of the source record identifies a second source record, and determines whether the registry includes a second registry identifier associated with a second data record generated based on the second source record. The reference engine sets an indicator identifying the data record if the registry does not include the second registry identifier, and clears the indicator if the registry does include the second registry identifier.

20 Claims, 12 Drawing Sheets

CLOUD BASED MASTER DATA MANAGEMENT SYSTEM AND METHOD THEREFOR

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is contained in co-pending U.S. patent application Ser. No. 13/459,947 entitled "Cloud Based Master Data Management System and Method Therefor," filed on Apr. 30, 2012, the disclosure of which is hereby incorporated by reference.

Related subject matter is contained in co-pending U.S. patent application Ser. No. 13/459,955 entitled "Cloud Based Master Data Management System with Remote Data Store and Method Therefor," filed on Apr. 30, 2012, the disclosure of which is hereby incorporated by reference.

Related subject matter is contained in co-pending U.S. patent application Ser. No. 13/459,972 entitled "Cloud Based Master Data Management System with Configuration Advisor and Method Therefore," filed on Apr. 30, 2012, disclosure of which is hereby incorporated by reference.

FIELD OF THE DISCLOSURE

This disclosure generally relates to information handling systems, and more particularly relates to automating mapping of variables between business process applications.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
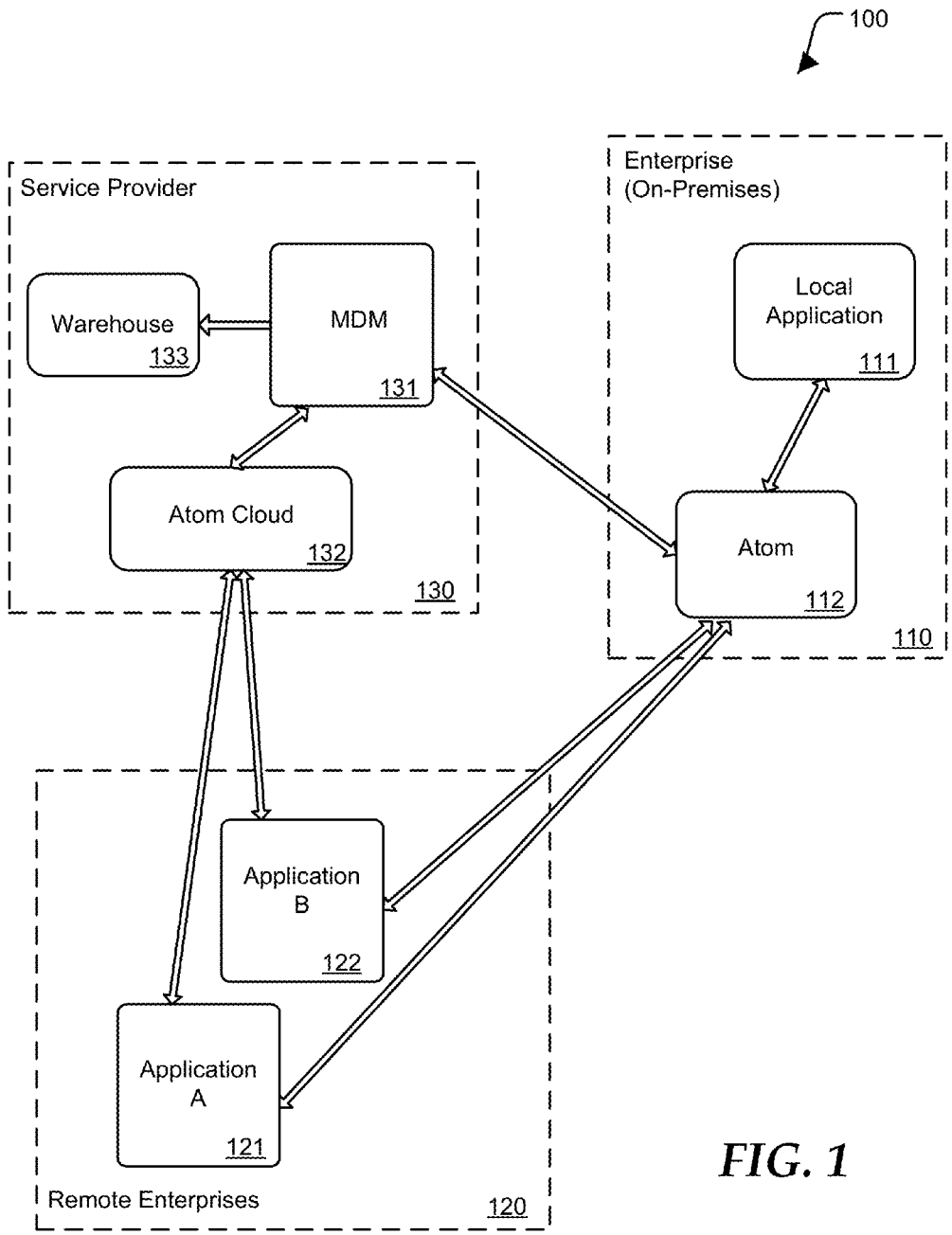
FIG. 1 is a block diagram illustrating a distributed business system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. Alternatively, the supplier may engage computer programmers to create a customized software application to meet these requirements, which is often exceptionally time-consuming and expensive.

An enterprise, such as a business, can maintain information handling systems and associated software applications and information storage devices that are located on-premise. In addition, an enterprise can utilize equipment, application software, or other services that are located off-premise, accessible via a communications network. For example, an enterprise may outsource various aspects of their business, such as customer relationship management (CRM), enterprise resource planning (ERP), and the like to an external vendor. Regardless of whether or not portions of a business process are distributed off-premise, an enterprise typically maintains multiple information databases that must be kept consistent. For example, if customer information included at a sales invoice application is updated, corresponding information included at a product shipping application should be similarly updated. The process for maintaining consistency between two or more information sources is known as master data management (MDM). MDM generally provides processes for collecting, aggregating, matching, consolidating, quality-assuring, persisting and distributing information throughout an organization to ensure consistency and control in the ongoing maintenance and application use of the information. Information managed by an MDM system can include customer, product, vendor, employee, and similar information. Techniques described herein enable users to conduct all setup, configuration and management of MDM services using an Internet Web browser. The disclosed MDM system is multi-tenant, providing data management services to multiple clients concurrently at a single MDM instance.

FIG. 1 shows a distributed business system 100 that includes both on-premises and off-premises resources according to a specific embodiment of the present disclosure. The system 100 includes an enterprise 110, remote enterprises 120, and a service provider 130. The enterprise 110 includes a local application 111 and an atom 112. The enterprise 110 can be a business, an organization, or another type of enterprise. For simplicity, the following discussion will assume that the enterprise 110 is a business and that the remote enterprises 120 and the service provider 130 represent other businesses that provide business services to the enterprise 110. The atom 112 is an interface process module for communicating with entities outside the premises of the enterprise 110. For example, the atom 112 can include a software program that can be executed at an information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The atom 112 is configured to communicate with the remote enterprises 120, the with service provider 130, and with other enterprises, applications, databases (not shown at FIG. 1), and the like. The atom 112 can communicate with the remote enterprises 120 and the service provider 130 via the Internet or by using another communications medium. The local application 111 is another software application used to conduct one or more aspects of the business, such as a sales or marketing application program. The enterprise 110 may utilize other local applications, not shown in FIG. 1. Individual enterprises are assumed to be located remotely from one another, unless explicitly specified otherwise. As used herein, the term remote refers to a distinct geographical location.

The remote enterprises 120 can represent one or more business organizations. These organizations may be affiliated with the enterprise 110 or they may represent other businesses. The remote enterprises 120 include two applications, an Application A 121, and an Application B 122. For example, the Application A 122 can represent a CRM service and the Application B 122 can represent an ERP service that the enterprise 110 has commissioned to perform the respective services. In other words, the enterprise 110 may represent a business that has out-sourced CRM and ERP services to the remote enterprises 120. The service provider 130 includes an MDM system 131, an atom cloud 132, and a warehouse 133. The MDM system 131 provides master data management services to the enterprise 110, as well as to other enterprises that are unrelated to the enterprise 110 (not shown at FIG. 1).

Accordingly, the MDM system 131 can be referred to as multi-tenant, for example providing data management services to multiple business clients concurrently.

The atom cloud 132 includes multiple individual atoms. Each atom of the atom cloud 132 implements a business process associated with a respective client and associated with one or more respective remote applications, such as one of the remote applications 120. In an embodiment, a client can define an atom to include multiple processes and multiple communicative connections to respective remote applications. The warehouse 133 provides archive storage. For example, the warehouse 133 can provide data backup services and can store outdated information. In an embodiment, a client such as the enterprise 110 can access information stored at the warehouse 133. Furthermore, the service provider 130 can provide analytical services to clients based on archived data stored at the warehouse 133.

During operation, the atom 112 and the atom cloud 132 monitor the local application 111, the remote application 121, and the remote application 122 to determine if a value of a source record stored therein has changed. If an atom associated with an application determines that a source record has been updated, the atom provides the updated information to the MDM system 131. In response to receiving the change notification, the MDM system 131 can update a golden record maintained by the MDM system 131. The atom 112 and individual atoms at the atom cloud 132 also monitor the MDM system 131 to identify if a value at a golden record maintained at the MDM system 131 has changed. If an atom determines that a value at a golden record at the MDM system 131 has changed, the atom can initiate actions to update corresponding source records at the other applications, as applicable. For example, if a phone number associated with a customer is updated at Application A 121, a process at the atom cloud 132 can determine that the change has occurred and provide the change to the MDM system 131. In response, the MDM system 131 can update a golden record associated with the customer information. The atom 112 or the atom cloud 132, having detected the update at the MDM system 131, can forward the revised phone number to the Application B 122 and to the Local Application 111.

As used herein, a record can include a single string or a single numerical value; however a record typically includes a collection of fields and each field, also referred to as an attribute, can be associated with a respective value. For example, a record can include a collection of information associated with a product, such as a product name, a product model number, product specifications, product inventory, and the like. In an embodiment, a format of a record or a collection of records can comply with a standard or proprietary syntax such as the Extensible Markup Language (XML), a comma-separated list, an encrypted or unencrypted encoding scheme, or another format.

Figure 2:
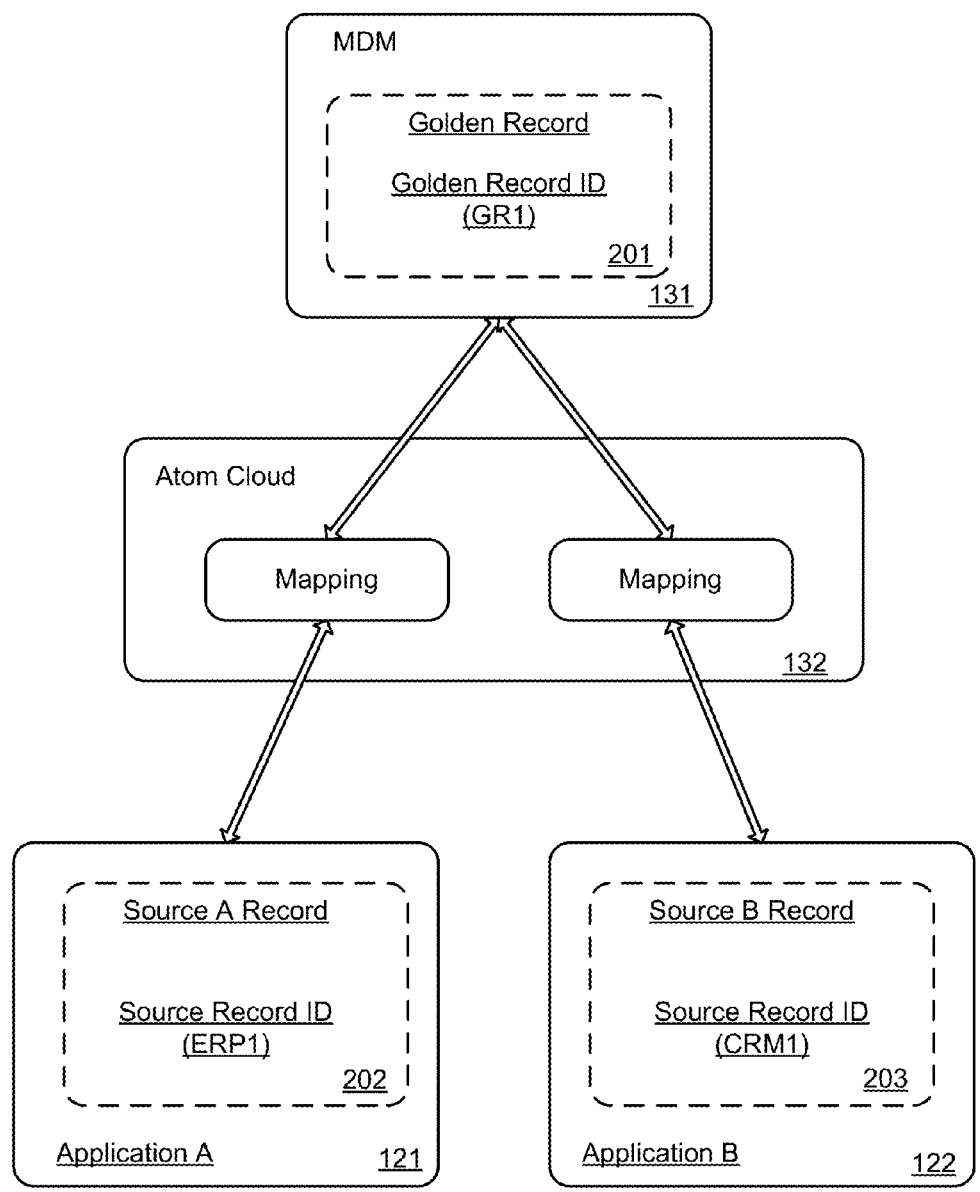
FIG. 2 is a block diagram illustrating operation of a Master Data Management (MDM) system according to an embodiment of the present disclosure.

FIG. 2 shows the operation of the MDM system 131 of FIG. 1 in accordance with an embodiment of the present disclosure. The MDM system 131 can include a large number of golden records including a golden record 201. The golden record 201 is identified by a golden record identifier GR1. The MDM system 131 maintains a link between the golden record identifier and a corresponding source record identifier at each applicable application. For example, the golden record 201 may correspond to a collection of information associated with a particular customer and may include a phone number associated with the customer. The Application A 121 can maintain a source record 202 that includes information about the customer, also including the customer's phone number. The source record 202 is identified by a source record identifier ERP1. Similarly, the Application B 122 can maintain a source record 203 that includes the customer phone number. The source record 203 is identified by a source record identifier CRM1. Accordingly, the MDM system 131 maintains a link between the golden record ID GR1 and the each of the source record IDs, ERP1 and CRM1. The golden record 201 can include a super-set of information relative to the source records. For example, the golden record 201 can include a plurality of data fields wherein some of the data fields can be associated with one set of applications while other data fields can be associated with another set of applications. The act of standardizing or augmenting information contained in a golden record is referred to herein as enrichment.

The atom cloud 132 is configured to map fields at the golden record 201 to corresponding fields at applicable source applications. This mapping can include a string manipulation specification that the atom cloud 132 can perform as the atom cloud 132 transfers information between the golden record 201 and the source records 202 and 203. For example, the golden record 201 and the source record 202 can include a data field representing a nine digit Zip Code, while the source record 203 can include a data field representing a seven digit Zip Code. Accordingly, if the atom cloud 132 determines that the Zip Code stored at the MDM system 131 has changed, the atom cloud 132 is configured to truncate the four right-most digits from the Zip Code before presenting the information to the source application 122 for update. Similarly, the atom cloud 132 can perform string manipulations on information as the information is forwarded from the source record 203 to the golden record 201.

Figure 3:
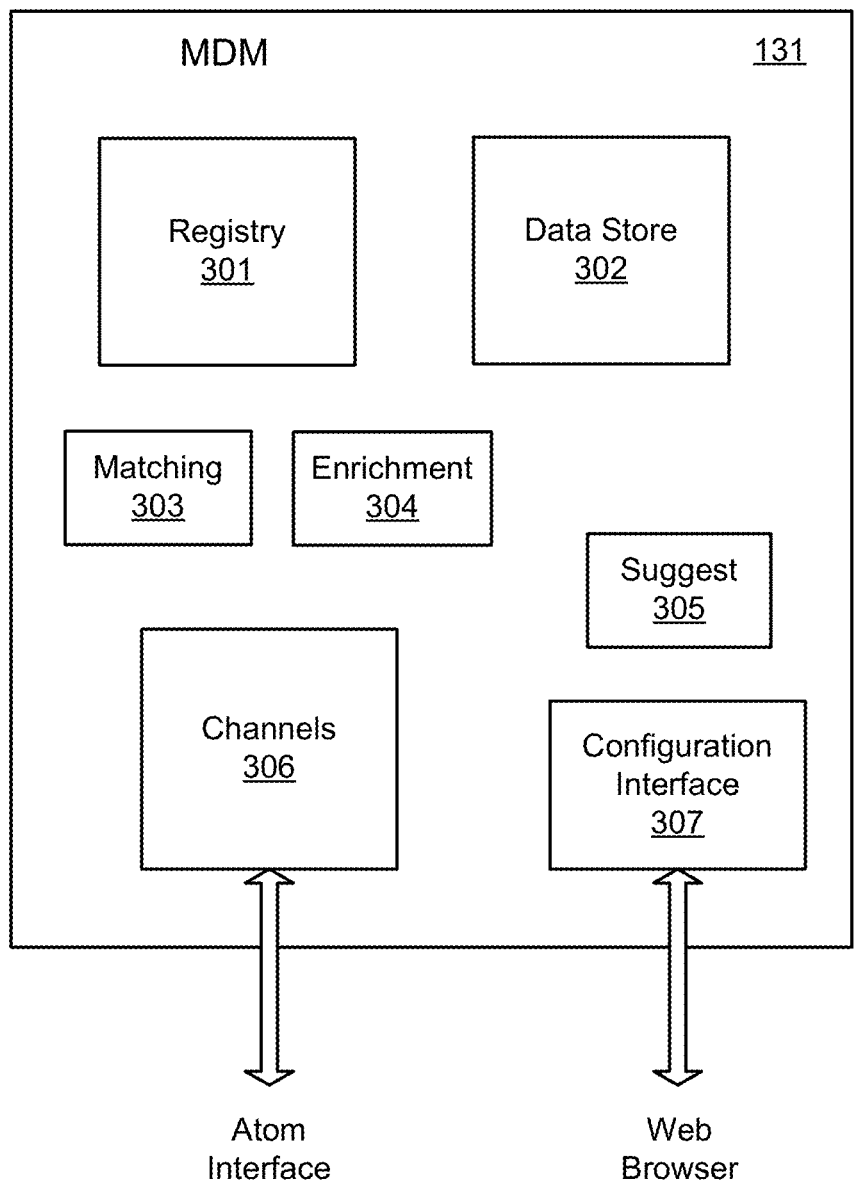
FIG. 3 is a block diagram illustrating the MDM system according to an embodiment of the present disclosure.

FIG. 3 shows the MDM system 131 of FIG. 1 according to another embodiment of the present disclosure. The MDM system 131 includes a registry 301, a data store 302, a matching unit 303, and enrichment unit 304, a suggest unit 305, channels 306, and a configuration interface unit 307. The registry 301 maintains links between each golden record managed by the MDM system 131 and one or more corresponding source records, each record having a respective identifier as described above. The registry 301 has the ability to enumerate new golden records, add and remove links to/from golden records, merge golden records into a single golden record, split a golden record into multiple golden records, and the like. In addition, the registry 301 is configured to maintain a record of the aforementioned events and allows access to the event history since a specified point in time. In an embodiment, the registry 301 provides a means to view a record, record IDs, and the value of links that associate golden record identifiers with source record identifiers.

The data store 302 is configured to store each of the golden records managed by the system. In one embodiment, the data store 302 is included at or proximately located near other portions of the MDM system 131. For example, the MDM system 131 can include one or more servers installed at an equipment rack and the data store 302 can include one or more disk drives immediately accessible to the server over a local interconnect. In another embodiment, the data store 302 can be located geographically remote from other portions of the MDM system 131. For example, portions of the data store 302 associated with a particular client can be located on-premise at a corresponding client enterprise, such as at the enterprise 110 of FIG. 1. Alternatively, the data store 302 associated with one or more clients can be provided at another enterprise that is remote from the MDM system 131, such as at one or more commercial enterprises that provide data storage and archival services. In an embodiment, the data store 302 can segregate records of one client from records of another client, while in another embodiment; records of disparate clients can be intermingled on a single logical device or group of devices. In an embodiment, the data store can provide versioning of golden records, where each version can be represented as the record's full XML tree or, alternatively, as an XML tree that only contains incremental changes with respect to a record's previous version. In another embodiment, the data store 302 can expose a way to discover record updates and acknowledge receipt of outstanding record updates. In still another embodiment, records or record attributes can be associated with a corresponding time stamp to identify when each version of the attribute or record was created or updated. The time stamps permit retrieval of a record as it appeared at a specified time.

An important aspect of the operation of the MDM system 131 is to prevent duplication of data within the system. For example, data associated with a new source application may include a customer name and address, while an existing golden record also may include a person by the same name, but having a different address. Accordingly, the MDM system 131 should determine whether the address at the existing golden record should be updated, or whether a new golden record should be created. Accordingly, the matching unit 303 is configured to evaluate incoming source records that are not yet linked to a corresponding golden record and to determine whether an existing golden record contains the information included in the source record. A match between a source record and a golden record need not be exact. For example, the matching unit 303 can determine that a customer Bill W. Smith included at an existing golden record is the same as a customer William Smith included at a source record.

In an embodiment, the matching unit can compare attributes of a new source record with attributes of existing golden records to identify whether one of the golden records corresponds with the new source record. For example, the matching unit 303 can determine that an electronic mail address included at the new source record matches an email address included at an existing golden record. The matching unit 303 operates based on one or more predefined rules, which can include conditional expressions and corresponding logical operators. The rules can include logical expressions based on the value of attributes included at respective records. For example, a matching rule can compare a value of a string included at a new source record and representing a first name with a value of a string at an existing golden record and determine whether the values are identical. In another embodiment, the matching rules can include fuzzy compare operators operable to identify similarities between an attribute associated with a source record and an attribute associated with an existing golden record. In an embodiment, the suggest unit 305 can recommend matching rules to a user during initial configuration of the MDM system 131 by a user.

The enrichment unit 304 is configured to specify a standard or canonical form for a particular record, such as a golden record. For example, standard or proprietary formats and syntaxes may exist for storing data associated with a specific application, type of application, or type of information. These formats and syntaxes together define a data profile of a corresponding record. In an embodiment, the enrichment unit 304 can provide functions that can be executed to modify the value of one or more information fields as the information is incorporated into and retrieved from a golden record. For example, a standard format of a postal address included at a golden record may prescribe particular rules of capitalization and abbreviation, the number of digits included in a Zip Code, and the like. In an embodiment, third-party or on-line services can be accessed that provide standardized data. For example, a service organization can be accessed or hired to provide a standardized street address for a particular individual in response to being provided with a name of the individual. In another example, the service may provide missing information, for example a Zip Code. The enrichment unit 304 can be used to specify functions describing how to manipulate a value of a data field to conform to predefined best-practices. A function can specify operations such as truncation, concatenation, string or numerical manipulations, and the like. A function may be implemented using a scripting language, another programming language, or the like. In an embodiment, the suggest unit 305 can provide users with assistance during the initial configuration of the MDM system 131. For example, the suggest unit 305 can suggest new information fields that can be incorporated into a golden record, or can suggest a syntax for a value of a specific information field. In still another embodiment, the enrichment unit 304 can identify records having missing or incomplete data values. For example, the enrichment unit 304 can detect that a source record associated with a customer does not include an email address.

The suggest unit 305 is primarily affiliated with the configuration interface 307 and is configured to help a user initially configure and administer the MDM system 131. The suggest unit 305 is configured to accumulate exemplary practices of many users/clients of the MDM system 131 and to provide guidance or recommendations to other users based on the stored information. The stored information can include data profiles of golden records associated with a particular source application, enrichment standards, mapping procedures, matching rules and algorithms, and the like. For example, a new user of the MDM system 131 may be tasked with defining a data profile of a golden record corresponding to a particular third-party ERM application, and the suggest unit 305 can provide the user with recommendations based on the experience of other users that manage data associated with that ERM application. Recommendations can be provided in the form of initial form templates, drop-down menus, dialog boxes, and the like.

Configuration of the MDM system by a user includes specifying data profiles of one or more golden records, identifying one or more source records associated with remote applications or services, identifying mapping information to define a relationship between attributes of a source record and a corresponding golden record, providing matching rules, enrichment information, atom processes, and the like. In an embodiment, the suggest unit 305 can provide assistance to a user during each phase of the configuration process.

The suggest unit 305 can provide a template for a golden record based on a name or keyword provided by a user. For example, a user can specify that a particular golden record is associated with business contacts, a company's business organization, products, and the like. In response to a user specifying that a golden record is associated with a product, the suggest unit 305 can provide a golden record data profile that includes attributes identified by previous users of the MDM system 131 that generated golden records relating to products. Attributes associated with a golden record relating to products can include a name of the product, a description of the product, a product number, and the like. A template or recommendation provided by the suggest unit 305 can be modified by a user, if necessary. In addition to providing classification information of a desired golden record as described above, a user can request a golden record be generated in response to identifying a particular source record that they wish to have represented at the MDM system 131. For example, a user may identify a specific ERP record at a corresponding third-party service company. In response, the suggest unit 305 can provide a template of a golden record generated by one or more other users of the system 131 that corresponds to the identified source record. In an embodiment, the suggest unit 305 can provide multiple recommendations, each having a corresponding priority ranking. In an embodiment, the suggest unit 305 also can identify additional attributes based on attributes provided by a user. For example, the suggest unit 305 may identify that a user has included an attribute "street address" as a golden record under construction. The suggest unit 305 can alert a user that previous clients who included this attribute also included attributes corresponding to "country" and "Zip Code."

The suggest unit 305 can assist a new user in developing mapping rules based on the experience and practice of other users of the MDM system 131. For example, the suggest unit 305 can identify that a user wishes to map an ERP source record to a corresponding golden record and provide a template specifying the mapping of individual attributes between the source record and the golden record. In an embodiment, mapping suggestions can be provided based on the specific name of a service provider. In another embodiment, mapping suggestions can be provided based on the names of individual record attributes without knowing the specific name or affiliation of the source record, as would be necessary when providing mapping from a proprietary source record.

The suggest unit 305 can assist a user in specifying matching rules. The suggest unit 305 can evaluate the collection of attributes included at a golden record and any classification information provided by the user, and generate a template providing match rules identified by other users of the MDM system 131 that are associated with similar golden records. For example, the suggest unit 305 can recommend that matching rules first attempt to match a new source record to an existing golden record by comparing values associated with an e-mail attribute, followed by attributes associated with last-name, first-name, address, and the like.

In another embodiment, the suggest unit 305 can provide a user with validation rules based on validation policies implemented by other users of the MDM system 131. Validation rules can help describe how errors can be detected by the MDM system 131. For example, validation rules can identify the existence of probable duplicate golden records, and how MDM 131 can respond in such a situation. For example, the MDM system 131 can store information associated with a potential error at a manual resolution queue and notify a registered representative by email. The representative can log on to the MDM system 131 using an Internet browser to identify and resolve the error.

In still another embodiment, the suggest unit 305 can assist a user during the development of individual processes, such as processes defined and implemented at atoms of the atom cloud 132. For example, the suggest unit 305 can provide an initial template to a user based on atom processes generated by other users of the MDM system 131. The template can include communication protocols for querying corresponding source applications and MDM channels 306 to identify when respective records have been updated. Like other suggestions provided by the suggest unit 305, the template can be customized to reflect particular information already provided by the user during the configuration process. In another embodiment, atom templates can be retrieved from a registered library of off-the-shelf atom modules. The atoms can be further customized as needed based on information provided by the suggest unit 305.

The channels 306 provide an interface between individual atoms at the atom cloud 132 and the registry 301. Each source application at the remote enterprises 120 is uniquely associated with a corresponding channel at the channels 306. Each channel is configured to monitor the registry 301 to determine whether a golden record that is associated with a respective source record has been updated. If a channel determines that an associated golden record has been updated, the channel makes the updated information available for retrieval by the corresponding atom. In an embodiment, the channel provides the updated golden record in its entirety. In another embodiment, the channel provides only the portion or portions of the golden record that have changed. Each atom of the atom cloud 132 monitors a corresponding channel and forwards updated information to a corresponding source application if the channel indicates that an update to an associated golden record has occurred. In an embodiment, each channel of channels 306 can provide an interface to the registry 301 for updating a golden record at the registry 301 based on a request from a corresponding atom of the atom cloud 132. The channels 306 can be referred to as harmonization channels because it is through the update information provided at the channels 306 that individual atoms of the atom cloud 132 can update (harmonize) source records to be consistent with associated golden records.

The configuration interface 307 provides a graphical user interface (GUI) through which a user can configure operation of the MDM system 131 using an Internet web browser. The GUI can include menus, visual editors, symbolic dataflow diagrams, application wizards, scripting languages, and similar configuration tools that can be provided using a web browser. The GUI can be accessed using an Internet browser or by using another application providing communication using Internet protocols. In embodiment, the configuration interface 307 can provide an application programming interface (API) to support configuration or administration of the MDM system 131 using a software program. Configuration of the MDM system 131 includes identifying a collection of attributes that together form each golden record, herein referred to as a data profile of the record. Configuration also includes identifying source applications, enterprises, and associated channels, defining matching rules to be implemented by the matching unit 303, enrichment rules to be implemented by the enrichment unit 304, the location of a remote data store, if applicable, and similar information. During the configuration procedure, users can be provided with implementation and configuration suggestions based on information stored at the suggest unit 305. For example, the suggest unit 305 can provide an initial framework and provide additional guidance or recommendations to satisfy the specific needs of a user based on information stored at an information database. In an embodiment, the configuration interface 307 can provide an environment for defining the operation of the atom 112 and individual atoms of the atom cloud 132, described below with reference to FIGS. 9-11.

Figure 4:
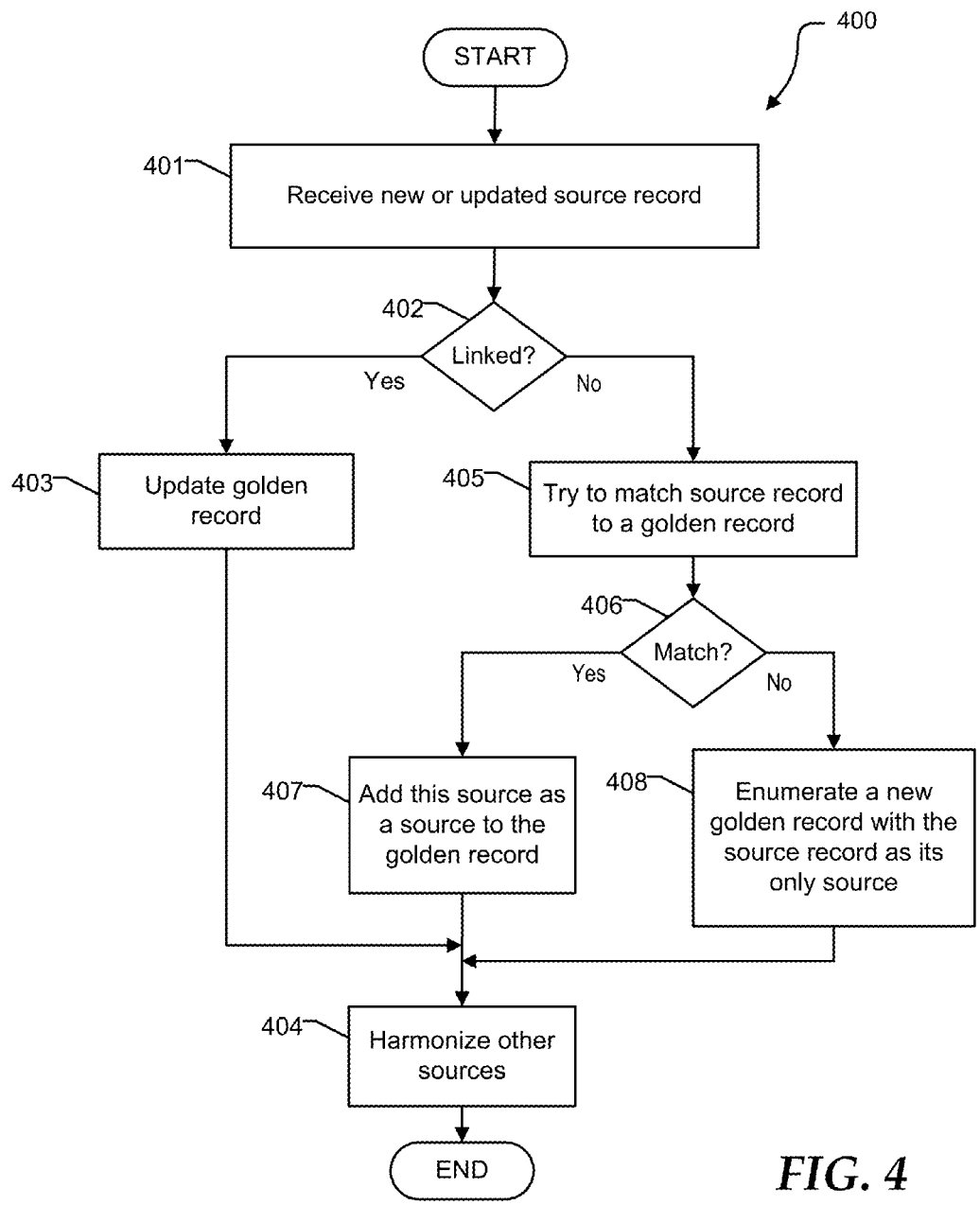
FIG. 4 is a flow diagram illustrating a method of operating the MDM system according to an embodiment of the present disclosure.

FIG. 4 shows a method 400 of operating the MDM system of FIG. 1 according to an embodiment of the present disclosure. The method 400 begins at block 401 where a new or updated source record is received an MDM system. For example, an atom at the atom cloud 132 can periodically determine whether a source record associated with an application at a remote enterprise has been modified. Alternatively, the a source record provided to the MDM system 131 may be a record that is not yet linked to a golden record maintained by the MDM system 131. The flow proceeds to the decision block 402 where it is determined whether the source record is presently linked to an existing golden record. If the incoming source record is linked to a golden record, the flow proceeds to block 403 where the corresponding golden record is updated to reflect the change identified in the source record.

The flow proceeds to block 404 where records all applicable sources are harmonized. Harmonization is a process through which source records that are linked to the updated golden record are updated so that the values of individual attributes are consistent between all the golden record and all source records that are linked to the golden record. For example, once a golden record has been updated, each channel of channels 306 that is associated with a source application that includes a source record linked to the updated golden record provides an indication of the updated golden record. An atom of the atom cloud 132 corresponding to each channel periodically monitors its respective channel and becomes aware of the updated golden record. In response, each atom transmits the change information to a respective source application, requesting that a corresponding source record be updated to reflect the new value at the golden record.

Each atom of the atom cloud 132 is an autonomous interface process module that is substantially unaware of activities underway at other atoms or at the MDM system 132. Instead, each atom monitors an associated channel for indications of a change to a golden record, and monitors each source application to identify a change at a source record. If an atom detects change information at a channel, the atom provides the update to a corresponding source record, requesting that the source record be updated to reflect the new value at the golden record. If an atom detects a change at a source record, the atom provides the updated source information to the MDM system 131 so that the corresponding golden record can be updated. One skilled in the art will appreciate that the independent processes described above will generally come to equilibrium when the golden record and all linked source records contain consistent values. One skilled in the art also will understand that there are exception-conditions that may arise that require remedial behavior, which is typically managed by the registry 301 and/or the data store 302. In an embodiment, channels 306 can provide an active role in controlling if and when updates are propagated to the registry.

Returning to decision block 402, if the source record received at block 401 is not yet linked to a golden record, the flow proceeds to block 405 where the MDM system 131 attempts to match the source record with an existing golden record. If a match is detected, the flow proceeds from decision block 406 to block 407 where the new source is linked to the corresponding golden record. The flow proceeds to block 404 where other source linked to the golden record are harmonized, as described above with reference to block 404. Returning to decision block 406, if the MDM system 131 fails to identify a golden record that matches the incoming new source record, the flow proceeds to block 408 where the MDM system 131 enumerates a new golden record with the associated source record as the only source. The flow proceeds to block 404 where the new golden record can be published via the channels 306.

Figure 5:
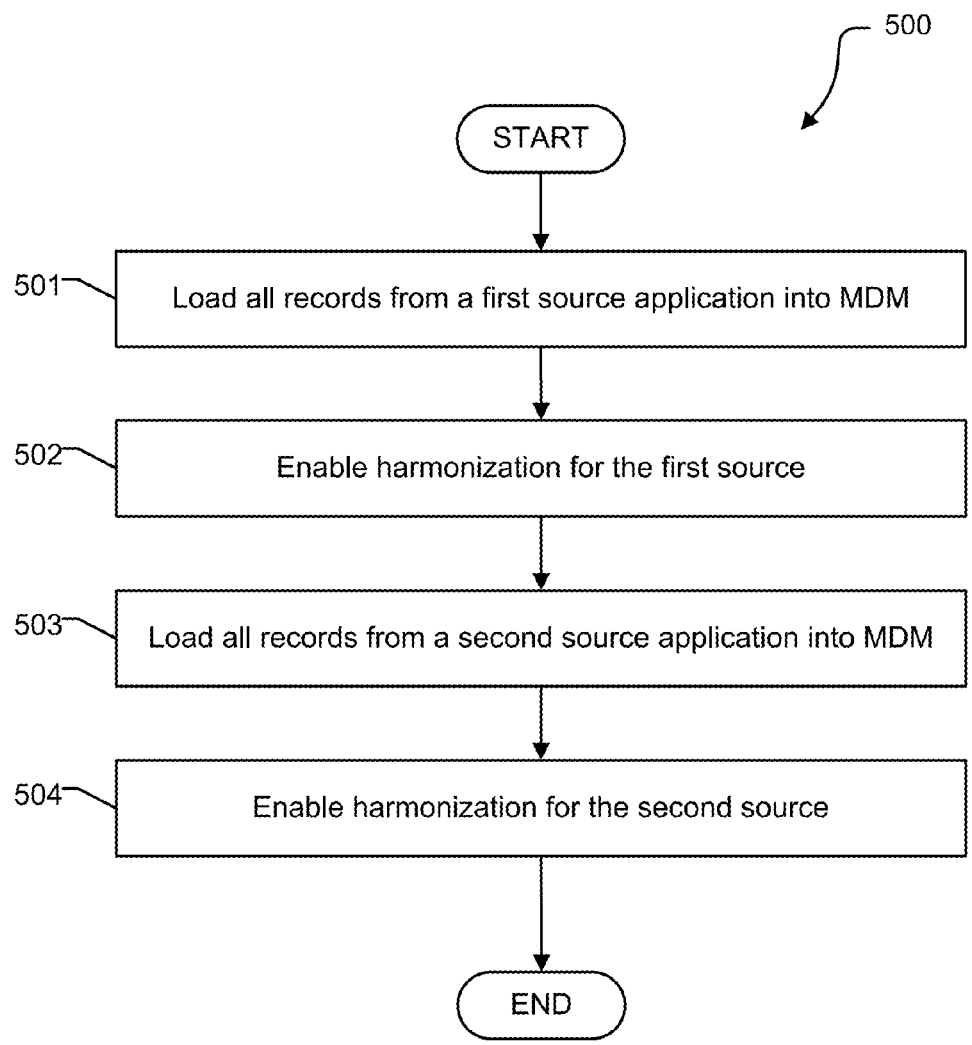
FIG. 5 is a flow diagram illustrating a method for initializing operation of the MDM system according to an embodiment of the present disclosure.

The harmonization process described above can be better understood with reference to FIG. 5 which shows a method for initializing operation of the MDM system 131 according to a specific embodiment of the present disclosure. In particular, the method illustrates the process of adding new sources to the MDM system 131 and associated harmonization procedures. The flow begins at block 501 all records from a first source application are loaded into the MDM system 131. At block 502, harmonization of the first source is enabled. At block 503, all records from a second source application are loaded into the MDM system 131. At block 504, harmonization of the second source is enabled.

Prior to receiving the source records from the first source application, there are no golden records present at the MDM system 131. As the MDM system 131 is bootstrapped, a collection of golden records is established. A collection of golden records associated with a particular user or client can be referred to as a golden record universe. Furthermore, a client may define multiple golden record universes, each associated with a different type of information. For example, one golden record universe may be associated with personnel records while another golden record universe may be associated with one of customer records, product records, and the like. Partitioning records into specific record universes, herein referred to as domains, can be beneficial so that matching expressions, enrichments policies, atom processes, and other configuration parameters can be customized for a particular type of records. For clarity, the following example is described in the context of two source applications, an ERP application and a CRM application, each with corresponding records.

Because the golden record universe is initially empty and one source record is not allowed to link to more than one golden record, the result is a golden record for each CRM record, with this CRM record being the golden record's only source link. From that point on the atom (interface process module) that checks the CRM application for data updates can send updates to the golden record universe based on updates to the CRM dataset. Once the CRM records have been linked to new golden records, the harmonization channel for updates to CRM is enabled. The CRM application is currently the only source for the golden record universe and thus this operation does not result in any updates going back to the CRM harmonization channel.

Once all records from the CRM application are uploaded and harmonization is complete, all of the records from ERP application are uploaded to the MDM system 131. The harmonization channel associated with the ERP application is presently inactive, so no updates are sent back to the ERP application. The CRM harmonization channel, however, is active and the following updates are sent on it: An ERP record that matched to an existing golden record (existing golden records are those that were created during the initial load of CRM records into the MDM system 131) is sent to the CRM application as a record update. This assumes that the ERP application contributed a new field or updated an existing field at the golden record. If the ERP record did not generate a change in the golden record, MDM simply records the ERP record as a link to the golden record and does not send any update on the CRM harmonization channel. If the ERP record did generate a change in the golden record, the CRM harmonization channel provides the updated record to the atom associated with the CRM application. The CRM atom determines whether updated information at the golden record is pertinent to the CRM application, and if so, the source record at the CRM application is updated. Consequently, the change at the CRM application is picked up by the atom which listens for CRM changes. The atom proceeds to communicate the change back to the MDM system 131. Unless the CRM record is enriched, this MDM update does not cause any change to the golden record since the golden record already contains the updated information.

An ERP record that did not match an existing golden record results in creation of a new golden record which propagates on the CRM harmonization channel and a new record is created in the CRM application. The creation of a new record in the CRM application is identified by the atom responsible for monitoring the CRM application, which propagates the change back to the MDM system 131. Next, the harmonization channel for providing updates to the ERP application is activated. Unlike the de-generate case of turning the channel on for CRM updates, de-generate as CRM was the only contributing source to the golden record universe at the time the CRM channel was activated, activating the ERP channel now generates channel updates. The act of turning the channel on results in the application examining the current state of each record in the golden record universe and acting accordingly. When this happens a golden record can be in one of the following three states, denoted as bronze, silver, and gold. A bronze record is a record that is linked-to only by a ERP link. In this case no update needs to be generated on the ERP channel that is being bootstrapped.

A silver record is a record that is linked to only by a CRM link. In this case a create request is placed on the ERP harmonization channel. If a create event for this golden record has already been placed on the channel, no duplicate create is generated. The latter can happen if a new CRM record gets enumerated as a golden record or an existing CRM-only golden record received an update from CRM after the channel was turned on and before channel bootstrap logic got to this particular golden record. A golden record is a record that is linked to by both ERP and CRM. In this case an update gets sent on the ERP harmonization channel. Note that the update to the CRM record (if one was necessary) has already been generated by the act of matching the ERP entity to the golden record that had the CRM link. The update on the ERP harmonization channel gets generated only if a special initial-match marker still exists for the ERP record and this golden record. This marker is necessary to avoid sending duplicate updates during a channel bootstrap and is honored both by the channel bootstrap logic as well as the normal update processing logic. The need for this marker is demanded by the fact that an update to the golden record can be completed after the channel gets turned on but before the bootstrap logic gets to this golden record.

Bringing a new source into an existing golden record universe is no different than integrating the second, third, fourth, etc. source in the cold bootstrap sequence described above. The sequence for integrating a new source into an existing golden record universe consists of all the steps that involve the ERP data in the previous discussion.

As described above, an enterprise can choose to subdivide records into categories, referred to herein as domains. For example, an enterprise may define a Contacts domain for storing information about individuals, such as the contact's mail address, phone number, and the like. In addition, the enterprise may define an Accounts domain for storing information relating to individual companies. Each domain can include one or more records. As described above, the MDM system 131 can generate a golden record corresponding to each of the source records, maintain synchronization between the source record and the golden record, and further harmonize the golden records with source records at other enterprises, if applicable. In an embodiment, a value associated with an attribute included at a record from one domain may correspond to another record, which can be included at a different domain. Such a field is herein referred to as a reference.

For example, a record in the Contacts domain associated with an individual can include a reference field for identifying the individual's employer. Information about the referenced employer is provided by a record included in the Accounts domain. The referenced object, which is a record, can be referred to as an entity. An example of a reference is:

Employer→Company_1

Where Employer corresponds to a field attribute and the attribute has one value, Company_1, corresponding to another record/entity. The entity is a record that is typically included in a domain different from the domain of the record that includes the reference.

In an embodiment, a reference field included at one record can include more than one value, thus referring to multiple entities that are different from the record containing the reference:

Employer→Firm_1, Firm_2

Where Employer corresponds to a field attribute and the attribute has two values, Firm_1 and Firm_2, each value corresponding to another record/entity. In a related embodiment, a reference can refer to multiple entities, where each entity can be accompanied by one or more parameters. For example, a reference can include an attribute "car parts" and refer to multiple values, each value including a quantity:

Car_→parts wheel(4), door(2)

Where Car_parts is a field attribute and the attribute has two values, each value corresponding to another entity and further including a parameter specifying a quantity.

All records associated with a particular domain typically share a common profile, also referred to as a model. The profile defines the fields that are included at the record and can include other information that defines the structure of the record, such as a format, schema, syntax, and the like. For example, the record profile can specify that a field within the record is for defining an attribute named Address, and further specify that a value associated with this attribute is a string. References are a special class of field within a record. During specification and configuration of a record profile, a client/user explicitly identifies that a particular field represents a reference. In an embodiment, the profile can include a declaration that a field is a reference, and define sub-fields for storing a reference attribute, a reference value (the referenced entity), and the name of the domain that contains the entity.

A reference typically introduces constraints to the storage and harmonization process described above. For example, an enterprise may submit a Contacts record for storage at the MDM system 131 that includes a reference to an Accounts entity that is not yet recognized by the MDM system 131. For example, an enterprise can submit records for storage in an out-of-order manner, or records may otherwise be received or processed out of order. A reference to an undefined entity is herein referred to as an unresolved reference. After a record that defines the entity is received and assigned a golden record ID, the MDM system 131 can take actions to link the initial record containing the reference to the record that defines the referenced entity. The MDM system 131 implements special procedures to support references. The procedures can be better understood with reference to FIGS. 6-8, below.

Figure 6:
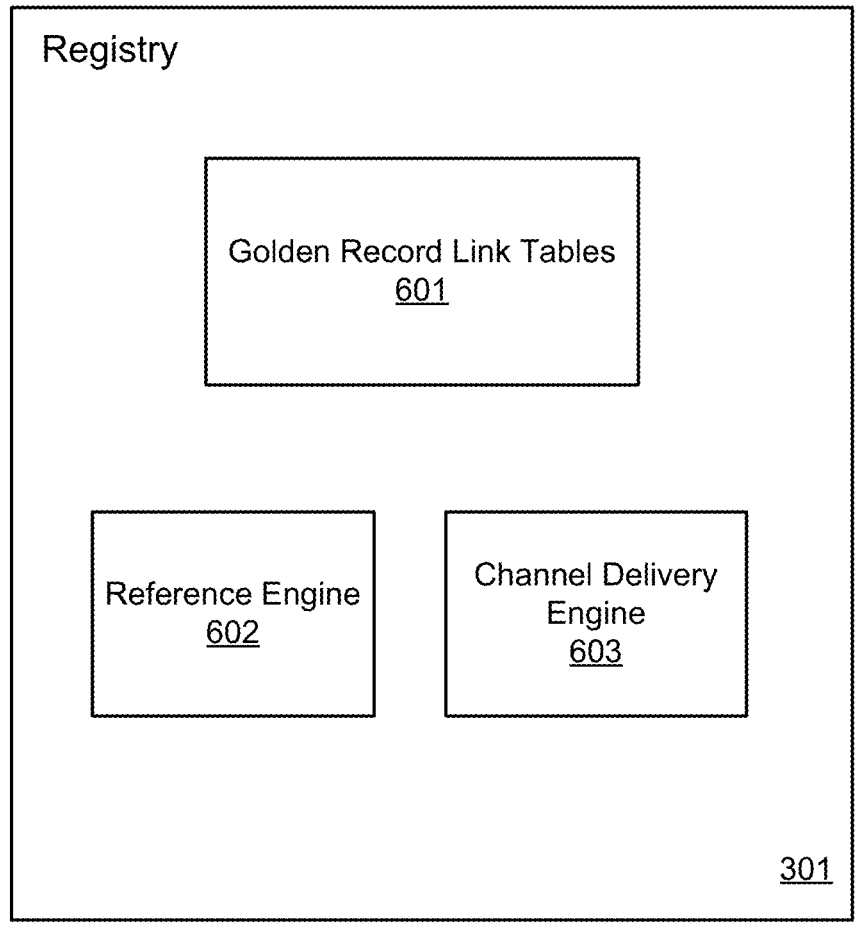
FIG. 6 is a block diagram illustrating additional features of the registry of FIG. 3 according to an embodiment of the present disclosure.

FIG. 6 shows additional features of the registry 301 according to an embodiment of the present disclosure. The registry 301 includes golden record link tables 601, a reference engine 602, and a channel delivery engine 603. The golden record link tables 601 maintain links between each source record ID and a corresponding golden record ID and pointers to the record data at the data store 302. In addition, the golden record link tables 601 also maintain links between an entity referenced by a source record and a golden record ID, which is a universal unique identifier (UUID) that the MDM system 131 uses internally to represent the entity. For example, the golden record link tables 601 can maintain a link between a UUID and a corresponding value included at each source record that references the entity. The tables 601 also can maintain a link between each source record entity identifier and the corresponding UUID. In other words, different enterprises and source records may refer to an entity, such as an employer, using different names, and the golden record link tables 601 can correlate each of these names with a single internal UUID. As contemplated above, the MDM system 131 may receive a record that includes a reference to an entity that has not yet been defined, the so-called unresolved reference described above. In this case, a UUID is not yet assigned and linked to the entity referenced by the record. Once a record defining the entity is received, the registry 301 can generate a UUID and establish a link to corresponding source entities.

The reference engine 602 is configured to keep track of unresolved references. For example, if an atom identifies a new source record that includes a reference, or a previously existing source record is updated to include a reference, the atom will provide the record to a corresponding channel for submission to the registry 301. The registry 301 can determine whether the entity specified by the reference is recognized, as indicated by a link between the source's name for the entity and an internal UUID at the golden record link tables 601. If a link is not included at the golden record link tables 601, a table at the reference engine 602 can be updated to include identification of the unresolved reference. For example, the table can include a source record ID identifying the source record, a copy of the reference including the reference attribute and referenced entity, and the name of the domain to which the entity belongs. Another example of an unresolved reference that can be maintained at the reference engine 602 is a case where a reference introduced at a source record from one enterprise is resolved, but one or more other source records linked to the same golden record has not yet provided the MDM 131 with a source record including a corresponding reference. In other words, a UUID can be linked to an entity specified at a reference at one source record, but is not yet linked to an entity specified at a reference at a related source record. In an embodiment, the reference engine 602 can be included at the channels 306. For example, a channel can manage and control propagation of incoming messages to the registry 301.

The channel delivery engine 603 is configured to determine if changes to a golden record should be propagated to associated sources. The decision of whether to harmonize a source is determined based on 1) a restriction policy associated with a source record, and 2) whether the golden record includes an unresolved reference, as identified by an entry at the reference engine 602. During configuration of the MDM system 131, a client can specify whether a particular source record can or cannot be updated to include an unresolved reference. In an embodiment, a restriction policy can be associated with a single source record at a corresponding source enterprise, with all source records at a source enterprise, or with all records associated with a specific domain. If a record is configured to strictly enforce references, changes at a golden record will not be propagated to the corresponding source record until the reference is resolved. In an embodiment, a data channel can include logic to identify a change at golden record independent of a governing restriction policy, but selectively provide the update to a corresponding atom based on the restriction policy.

Figure 7:
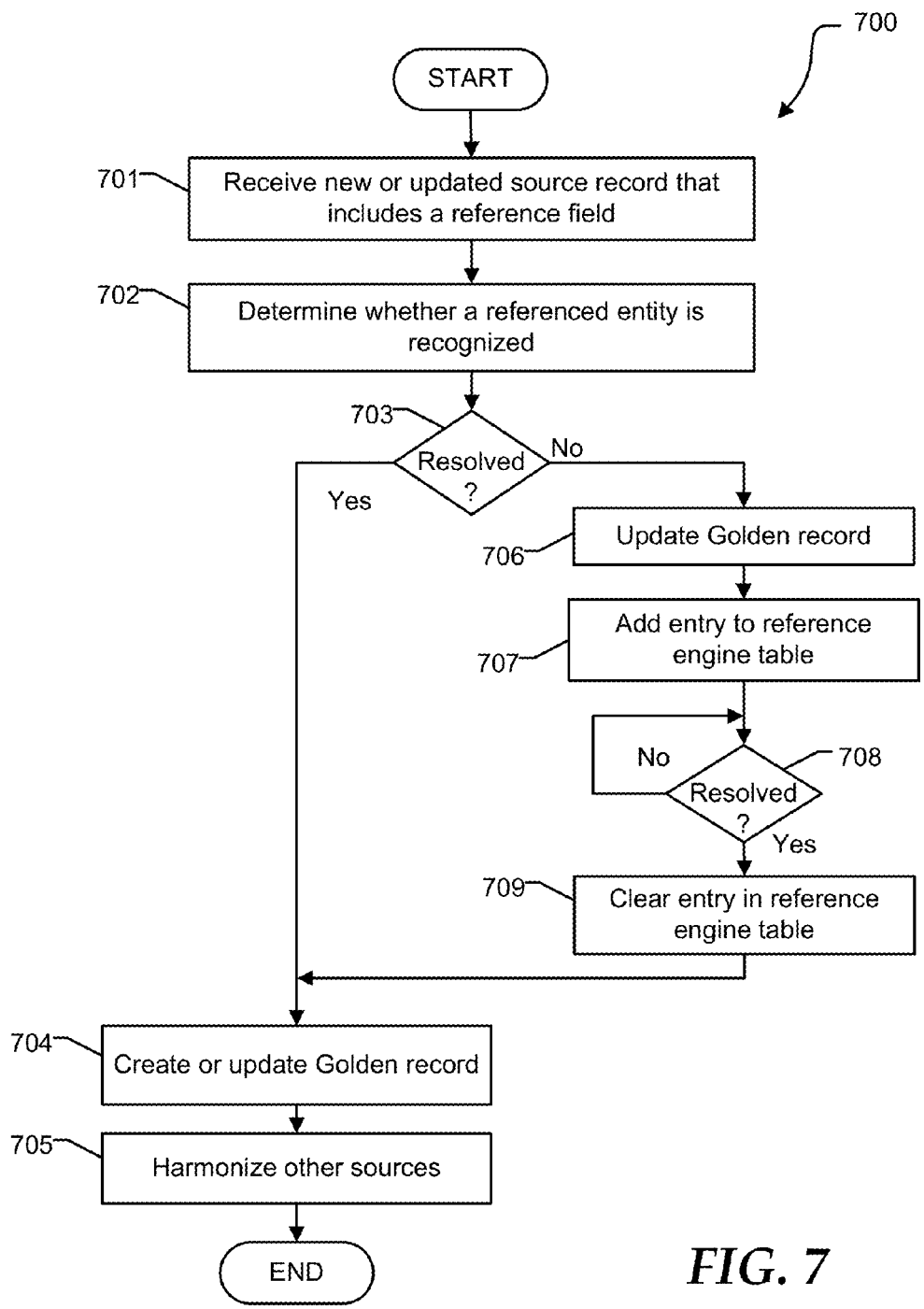
FIG. 7 is a flow diagram illustrating a method for processing records containing a reference according to a specific embodiment of the present disclosure.

FIG. 7 shows a method 700 for processing records containing a reference according to a specific embodiment of the present disclosure. The method begins at block 701 where a new or an updated source record that includes a reference field is received. For example, an atom at the atom cloud 132 can determine that source record 202 has been modified, and forward the record to a corresponding data channel. The registry 301, and the reference engine 602 in particular knows that the record includes a reference field based on the profile that defines the record. The method continues at block 702 where it is determined whether a referenced entity is recognized. For example, the reference engine 602 can access the registry to determine if the name used by the source application to refer to an entity has already been linked to an internal UUID. If the reference is a resolved reference, the method proceeds from decision block 703 to block 704 where an existing golden record is updated or a new golden record is created based on the received source record. For example, if the reference at the received source record includes a field: employer=company_abc, and the reference engine 602 contains a link associating company_abc with a UUID, the golden record can be updated to reflect the changes detected in the source record, the value at the reference field replaced with the corresponding UUID. As described above, the corresponding golden record may already be up to date if the original change to the source record came about as a result of harmonizing an updated golden record. The method continues at block 705 where other sources are harmonized based on the updated golden record. Because the reference included at the golden record has been resolved, restriction policies associated with each source need not be considered prior to propagating the updated record information to corresponding sources.

Returning to decision block 703, if entity referenced by the received source record is not recognized, the method proceeds to block 706 where an existing golden record is updated or a new golden record is created based on the received source record. In an embodiment, the golden record can include the reference field attribute but not include a UUID corresponding to the referenced entity, because no record identifying the entity has yet been received. For example, the value of the reference can include a null string. The method continues at block 707 where an entry is added to a table at the reference engine 602 identifying the unresolved reference, as described above. The method continues at decision block 708 where the entry identifying the unresolved reference is maintained at the reference engine 602 until the reference is resolved. For example, a subsequent record can be received at MDM system 131 that corresponds to the domain specified by the reference and that formally defines the referenced entity. As described above, the entity can be assigned an internal UUID and the golden record link tables can be updated to include link correlating the UUID to the value of the entity specified by the original source reference. The method continues at block 709 where the entry at the reference engine that was added at block 707 can be cleared because the reference is no longer unresolved. The method proceeds to block 704 where the golden record corresponding to the received source record is once again updated, however the reference field at the golden record now includes a UUID corresponding to an MDM-internal identifier of the referenced entity. At block 705, additional sources can be harmonized.

Figure 8:
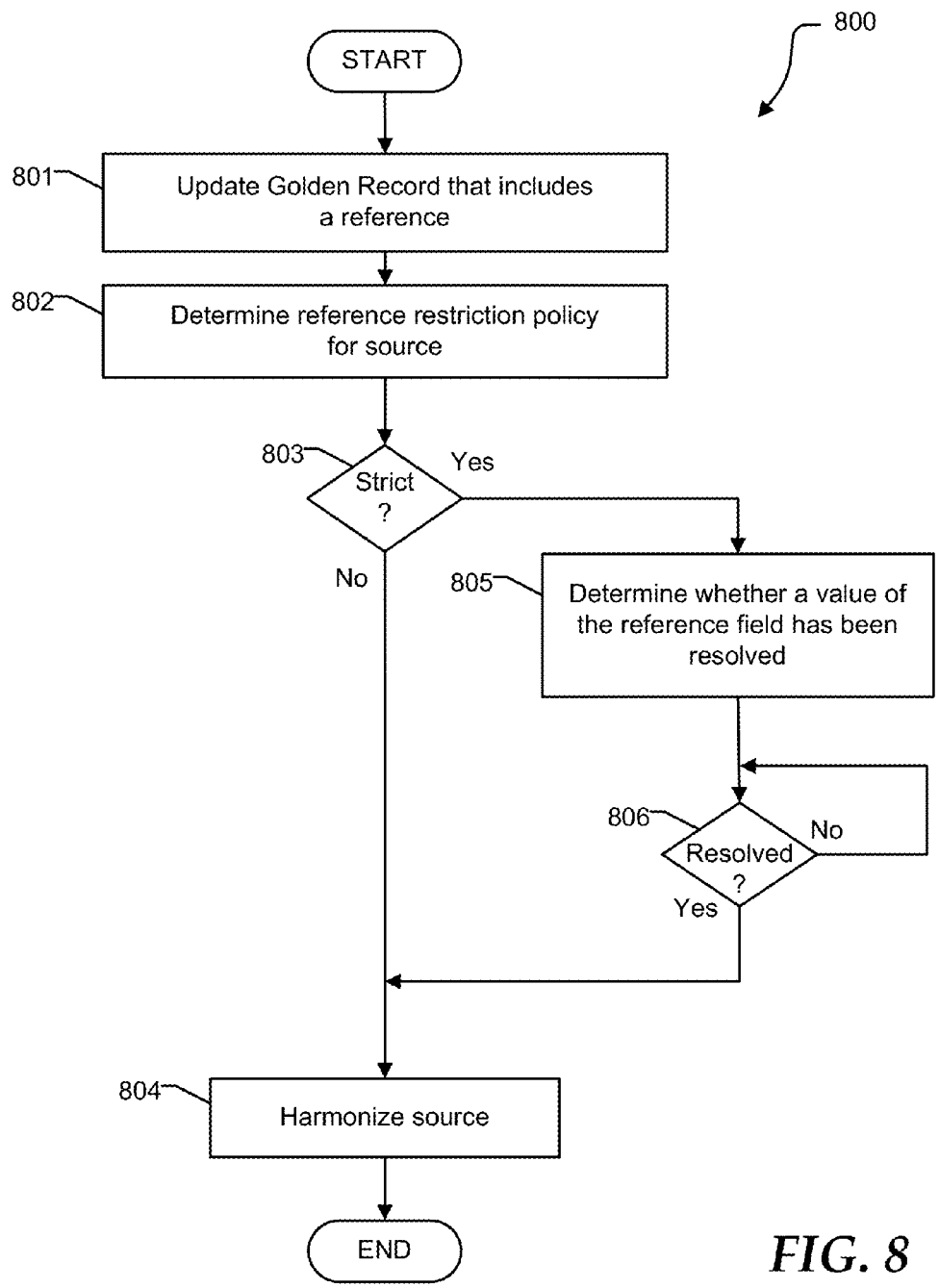
FIG. 8 is a flow diagram illustrating a method for determining whether to harmonize a source record according to a specific embodiment of the present disclosure.

FIG. 8 shows a method 800 for determining whether to harmonize a source record according to a specific embodiment of the present disclosure. The method begins at block 801 where a golden record managed by the registry 301 that includes a reference is updated. The method continues at block 802 where respective restriction policies associated with source records is determined. For example, data channels associated with sources linked to the golden record can query the channel delivery engine 602 to determine whether corresponding source records allow unresolved references. If the source record allows unresolved references, the flow proceeds from the decision block 803 to block 804 where the source record can be updated, if applicable. If the source record restricts unresolved references, the flow proceeds to block 805 where it is determined whether the updated golden record includes any unresolved references. For example, the channel delivery engine 602 can determine whether all references at the golden record include a UUID identifying a recognized entity. If any references remain unresolved, the method remains at decision block 806. Once the channel delivery engine 603 determines that all references identify a recognized entity, the method continues to block 804 where the source record can be updated.

In an embodiment, the atom interface process modules, such as the atom 112 and each atom of the atom cloud 132 can be generated using an Internet-based application program and a web browser. This application program is described below with reference to FIGS. 9-11.

Figure 9:
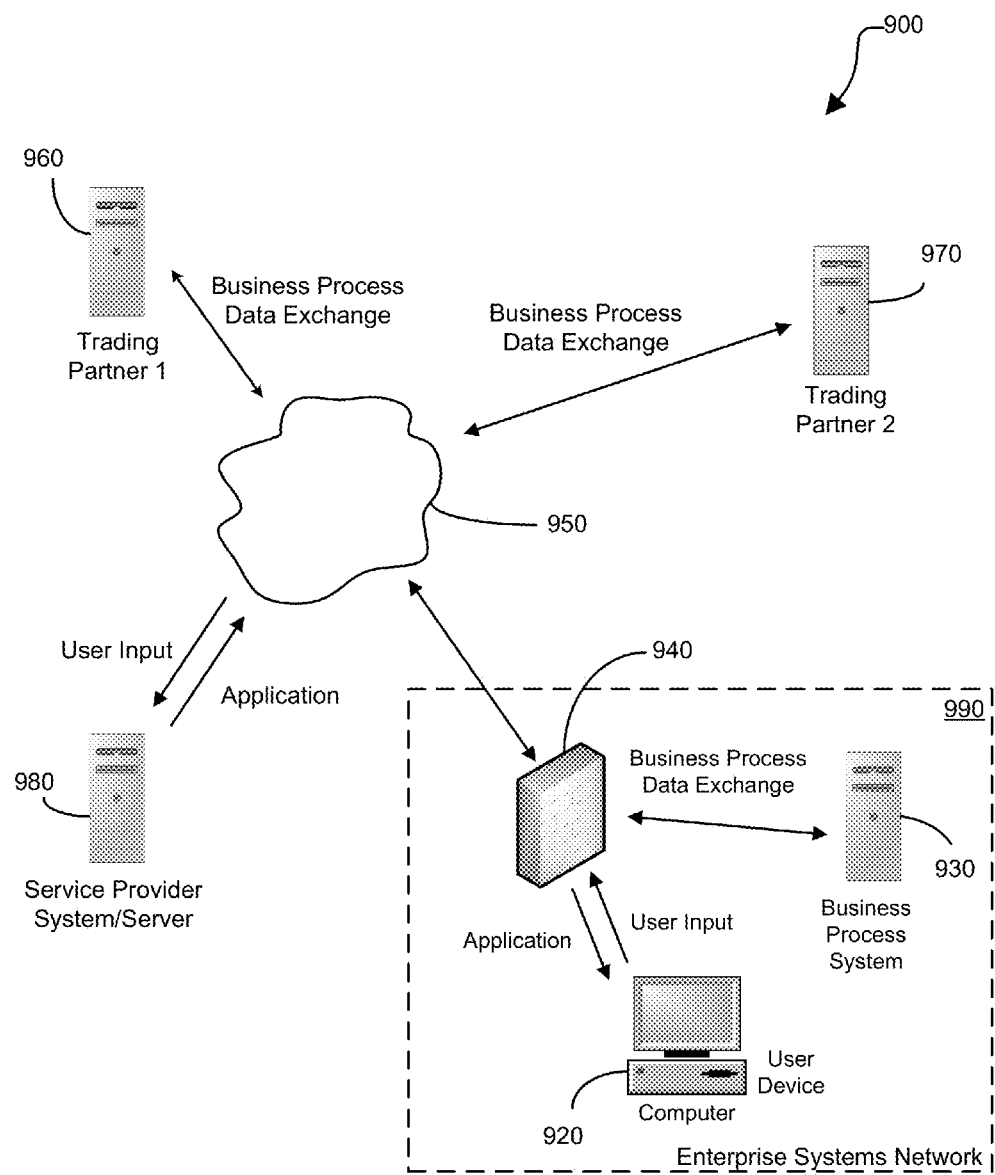
FIG. 9 is a block diagram illustrating a distributed business network system according to an embodiment of the present disclosure.

FIG. 9 shows a distributed business network system 900 including conventional information handling systems of a type typically found in client/server computing environments. More specifically, the system 900 includes a conventional user/client device 920, such as a desktop personal computer, enabling a user to communicate via a communications network 950, such as the Internet. The exemplary user device 920 may be configured with conventional web browser software. The web browser, such as Microsoft Corporation's Internet Explorer web browser software, allows the user to interact with websites via the network 950. The client device 920 is positioned within an enterprise network 990 behind an enterprise network's firewall 940. For illustrative purposes, the enterprise network 990 includes a business process system 930, which may include conventional computer hardware and commercially available applications and services such as ERP, CRM, and the like. The system 900 further includes trading partner systems 960 and 970 for receiving and/or transmitting data relating to business-to-business transactions. For example, a retailer may operate trading partner system 960 to allow for issuance of purchase orders to suppliers and to receive invoices from suppliers in electronic data form as part of electronic data exchange processes of a type well known in the art.

The system and methods disclosed herein allow an enterprise to obtain the capabilities needed to conduct the electronic exchange of data with one or more trading partners, internal applications, or applications available via the Internet, commonly referred to as Software as a Service. The present disclosure provides these capabilities in a unique fashion by providing the enterprise with a software application including the configuration information required for conducting the integration process, and also the executable code needed to make the process run, and specially configuring this application to run within the enterprise's network, for example, behind the firewall of the enterprise or within a third-party-hosted data center, etc., that is considered to be part of the enterprise's network so that it may connect to various software applications running internal to the enterprise's network.

In accordance with the present disclosure, a provider of a service (service provider) operates a service provider server/system 980 within the system 900. The system 980 may be specially configured in accordance with the present disclosure, and may be capable of communicating with devices in the enterprise's network 990. It should be noted that the communication between system 980 and network 990 can be essentially unidirectional in that communications/communication sessions originate from network 990 to system 980, and not from system 980 to network 990. Accordingly, the network 990 need not have its firewall 940 modified to allow incoming traffic from communications sessions originating from system 980. In an embodiment, the service provider, and system 980 in particular, can provide on-demand, real-time creation of customized software application. For example, the system 980 can be used to generate the atoms 112 and 132 and configure the MDM system 131 of FIG. 1. In another embodiment, the system 980 can serve as a host for execution of the atoms and/or MDM processes. In an embodiment, the tools and services provided by the server/system 980 can be provided via the configuration interface 307 of FIG. 3.

The system 980 may be configured in accordance with the present disclosure to provide web server functionality for presenting a user-accessible website. Communications between the user device 920 and the system 980 website may be performed using conventional communications technologies, such as the HTTPS protocol. The website may be specially configured to provide a graphical user interface providing a visual designer environment permitting a user to define process flows between applications/systems, such as between trading partner and enterprise systems, to model a customized business integration process. The graphical user interface may be used by different enterprises/customers of the service provider.

Figure 10:
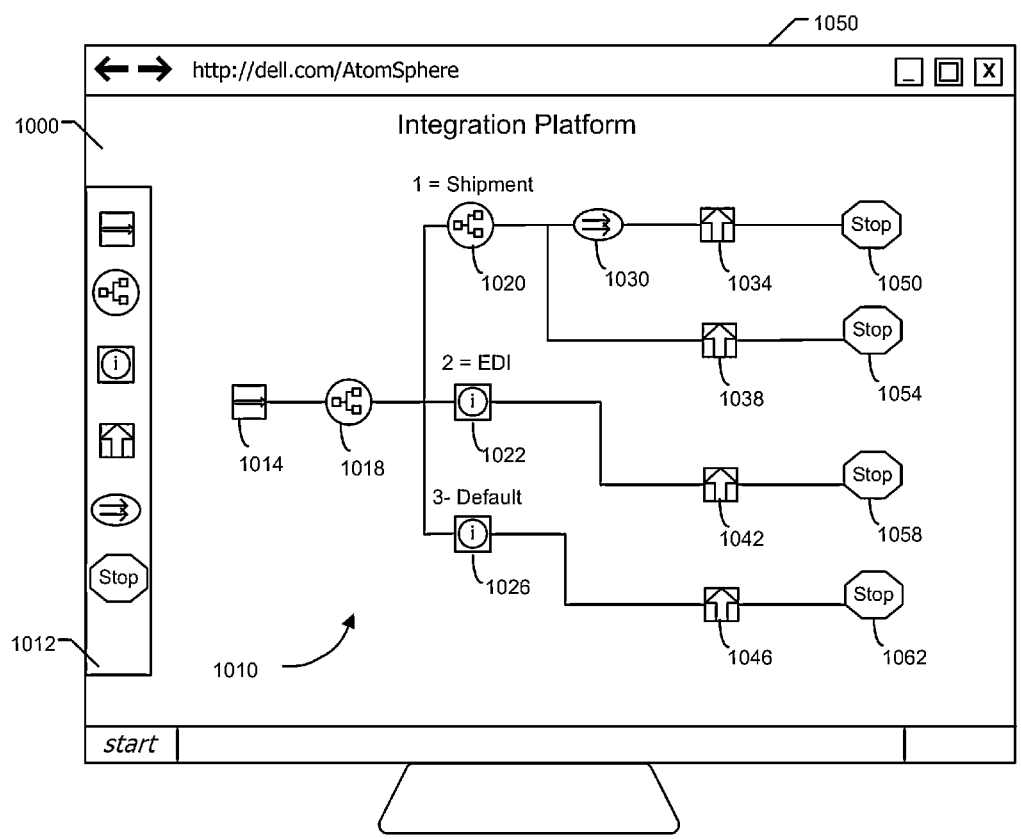
FIG. 10 illustrates a graphical user interface for developing a system integration application program according to an embodiment of the present disclosure.
Figure 11:
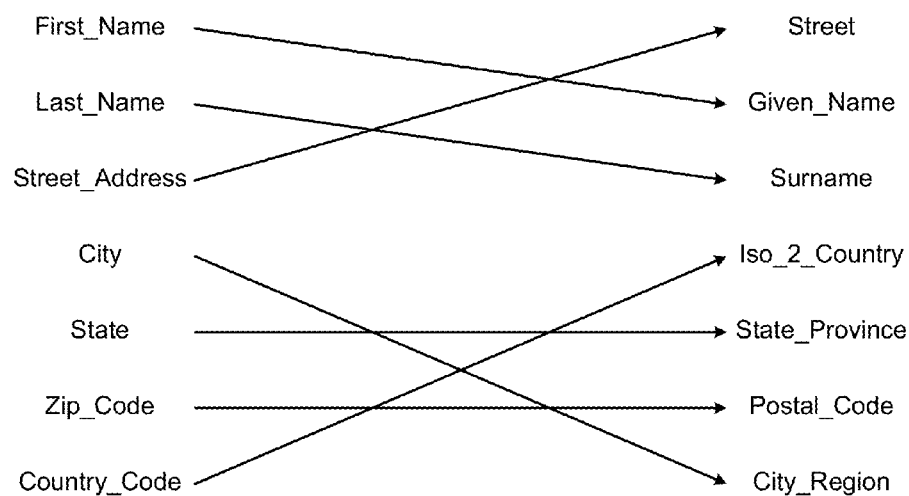
FIG. 11 is a block diagram illustrating a data map according to an embodiment of the present disclosure.

FIGS. 10 and 11 further illustrate a system for automating development of customized system integration application programs, such as the atom 112 and the atoms at the atom cloud 132. A web-based graphical user interface (GUI) provided by the system 980 allows a user to visually model a business process via a flowcharting process. During this modeling process the user selects from a predetermined set of process-representing visual elements. The graphical interface can be used to define and generate a wide range of system integration and process flows. For example, a process flow can enable bi-directional exchange of data between internal applications, between internal applications and external trading partners, or between internal applications and applications running external to the enterprise. Applications running external to the enterprise are commonly referred to as Software as a Service (SaaS). Each integration process represents a complete end-to-end interface. For example, a process could be modeled to accept a purchase order (PO) from a retailer, transform the PO into a format recognizable by a certain internal order management software application of the enterprise, and then insert the contents of that PO directly into the enterprise's order management system.

FIG. 10 shows a web-based GUI 1000 in accordance with a specific embodiment of the present disclosure. The GUI can be provided by the system 980 and can be used to define an integration flowchart. After the integration flowchart is created, including corresponding configuration parameters, the system 980 can generate custom software to provide the desired interoperability as defined by the user-generated integration flowchart. The custom software is a dynamic runtime engine and includes an executable software application capable of running on a computer within the enterprise's network, which may include, for example, networks owned and/or operated by third party data center providers. When started by a user, the executable software application connects to the system 980 and downloads an XML representation of the visual model representing the integration process, and all requisite code needed to run the integration process. The required code includes a generic application template, selected predefined code sets that are selected as a function of the user's needs as defined by the modeled process, and a data code set that includes input provided by the user for customizing the stock components for a specific integration process. Additional components may be retrieved as required. As changes are made to this model, via the website, or to the code that executes the model, the executable software application will automatically check for and apply these changes as needed without requiring human intervention.

The GUI 1000 provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 980.

The GUI 1000 allows the user to provide information relating to trading partners, activities, enterprise applications, enterprise system attributes, and/or process attributes that are unique to the end-to-end business integration process of a specific enterprise. For example, the graphical user interface may provide drop down or other user-selectable menu options for identifying trading partners, application connector and process attributes/parameters/settings, etc., and dialog boxes permitting textual entries by the user, such as to describe the format and layout of a particular data set to be sent or received, for example a Purchase Order.

By way of illustrative example, the website interface may provide a visual menu of elements in a drag-and-drop environment permitting the user to create a visual model of business process activities desired to be handled by the customized software application. For example, this may involve a user's identification of receipt of purchase orders as an activity, or of issuance of invoices as an activity. By way of illustrative example, FIG. 10 shows a GUI 1000 of an integration platform displayed within a web browser window 1050. The exemplary GUI 1000 displays an exemplary business process integration model 1010 in the form of a flow diagram modeling a shipment order business process. The visual model may be created by a user within the visual designer environment, via the website interface provided by the system 80.

The exemplary flow diagram of FIG. 10 includes an inbound connector element 1014, routing process elements 1018 and 1020, document Property elements 1022 and 1026, data transformation process element 1030, outbound connector elements 1034, 1038, 1042, and 1046, and process end elements 1050, 1054, 1058 and 1062. Various ones of these elements are selected from a menu 1012 of elements and arranged by the user relative to one another as appropriate to model a corresponding business process. The elements may require data input from a user. For example, the inbound connector element 1014 selected from the menu by the user may be configured by the user for a specific enterprise and process by the user's selection of the element and completing dialog boxes, selecting menu items, etc. as appropriate. For example, the user may provide as input for configuring data entry element 1014 that the data will be inbound from an information handling system at a remote enterprise. This may be performed via a data entry field displayed in the window upon selection of data entry element 1014. The element, in combination with any required data input, may be associated with a specific Connector code set stored in the memory of the system 980.

The outbound connector elements may be similarly configurable. For example, the last step of the integration process may involve sending shipping order data to an information handling system at another remote enterprise. The Shipping Order will be prepared as an XML message, which is a readily recognizable format. The XML message is then sent to the outbound connector, and the outbound connector converts the XML message from this simple, recognizable format into the proprietary format that is understood by the SAP system. This conversion, and the need for it, is transparent to the user configuring the integration process. By way of further example, the routing element may require input for routing logic to be applied; the Document Properties element may require input for file naming, file storage location, etc. to be applied. There may be other elements as appropriate or necessary for modeling business processes, as desired.

Each branch of the flow diagram represents an end-to-end business process to be integrated. In the example of FIG. 10, the first (top-most) branch may model a process involving receipt of data from the remote enterprise system in a corresponding format, routing the data according to prescribed logic (for example, 1=shipment), further routing according to further logic, transforming the data from the remote enterprise system format to the destination system format by Data Transformation process element 330 to create an appropriately formatted XML document, and then transmitting the transformed data to the destination system in accordance with the properties and attributes of the outbound application connector 1034. Examples of other common activities include synchronizing customer data between applications, synchronizing product information between applications, notification of receipt of goods ordered by a retailer, receipt of a work related injury claim, and many others.

Documents that are read into or sent out of a business process, such as the business process of FIG. 10, are each associated with a data profile. A data profile associated with a document, or with an application as a whole, includes the names of data fields included in the document. The data profile also can describe the layout or format of respective documents. For example, a data profile can include delimiters or column positions, data types, minimum/maximum string lengths, and the like. Profiles are most notably used in association with data maps. Data maps describe how information can be transferred from one document to another. For example, to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile.

FIG. 11 shows a data map 1100 according to an embodiment of the present disclosure. The data map 1100 includes data fields 1110 included at a first software application, labeled Application A, and data fields 1120 included at a second software application, labeled Application B. Each data field represents a variable that can be associated with a value. For example, the data fields 1110 include variables First_Name, Last_Name, Street_Address, City, State, Zip_Code, and Country_Code. The data fields 1120 include Street, Given_Name, Surname, Iso_2_Country, State_Province, Postal_Code, and City_Region. In an embodiment, a user of the business process integration platform graphical user interface 1100 can manually generate a data map.

In an embodiment of the present disclosure, a user may drag and drop individual fields associated with a source data profile to a corresponding field of a destination data profile, as indicated by the arrows of FIG. 11. For example, the variable First_Name of Application A has been mapped to the variable Given_Name of Application B. The service provider 980 of FIG. 9 may use the data map 1100 to generate and configure a system integration application program that will implement a customer's business process, such as the business process integration model 1010 of FIG. 10. In another embodiment, the generation of a data map may be partially or fully automated based on information stored at a mapping database.

Figure 12:
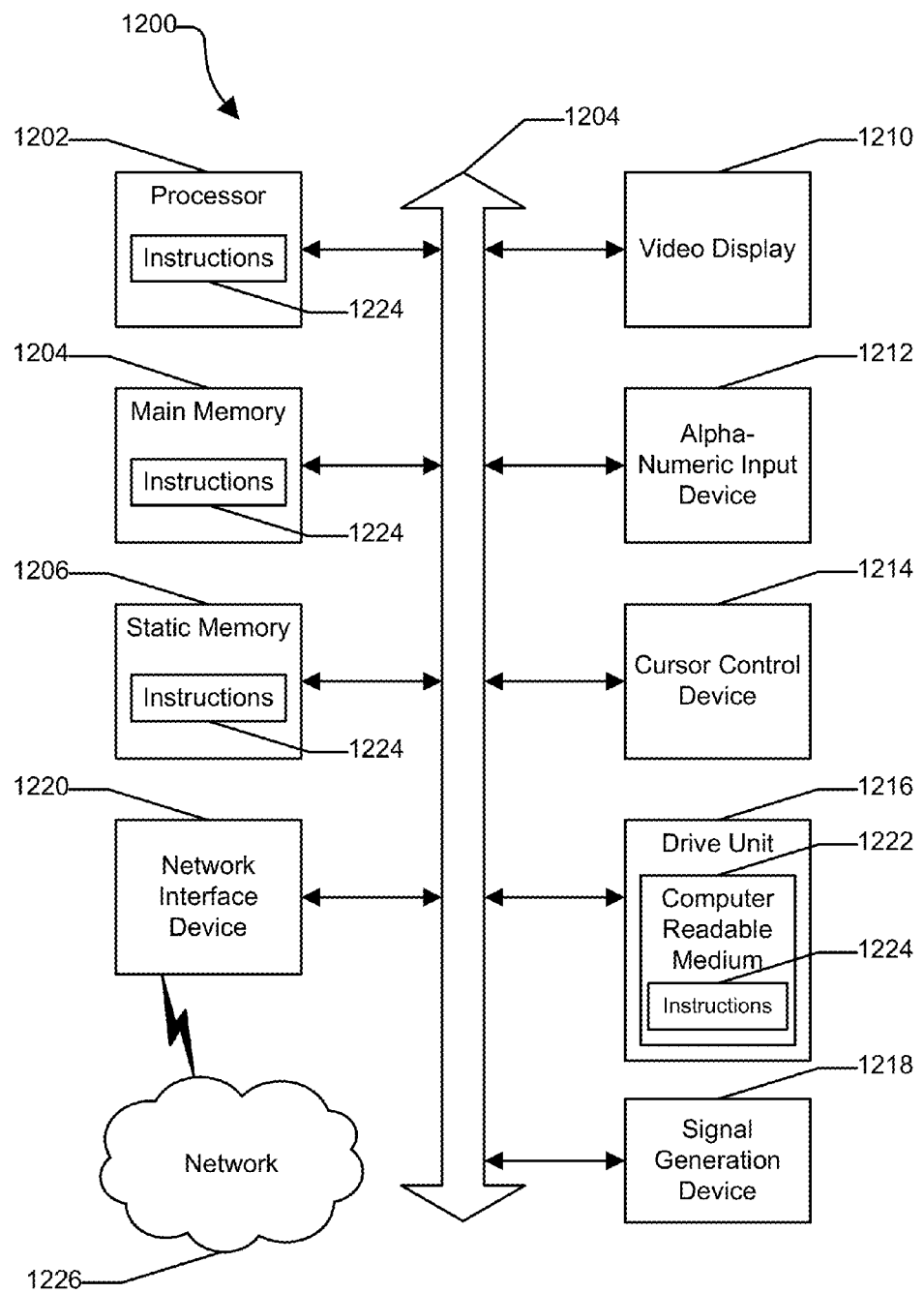
FIG. 12 is a block diagram of an information handling system according to an embodiment of the present disclosure.

FIG. 12 shows an information handling system 1200 capable of administering each of the specific embodiments of the present disclosure. The information handling system 1200 can represent the user device 920, the systems 930, 960, 970, and 980 of FIG. 12, or data processing devices associated with the system 100. The information handling system 1200 may include a processor 1202 such as a central processing unit (CPU), a graphics processing unit (GPU), or both. Moreover, the information handling system 1200 can include a main memory 1204 and a static memory 1206 that can communicate with each other via a bus 1208. As shown, the information handling system 1200 may further include a video display unit 1210, such as a liquid crystal display (LCD), an organic light emitting diode (OLED), a flat panel display, a solid state display, or a cathode ray tube (CRT). Additionally, the information handling system 1200 may include an input device 1212, such as a keyboard, and a cursor control device 1214, such as a mouse. The information handling system 1200 can also include a disk drive unit 1216, a signal generation device 1218, such as a speaker or remote control, and a network interface device 1220. The information handling system 1200 can represent a server device whose resources can be shared by multiple client devices, or it can represent an individual client device, such as a desktop personal computer.

The information handling system 1200 can include a set of instructions that can be executed to cause the computer system to perform any one or more of the methods or computer based functions disclosed herein. The computer system 1200 may operate as a standalone device or may be connected such as using a network, to other computer systems or peripheral devices.

In a networked deployment, the information handling system 1200 may operate in the capacity of a server or as a client user computer in a server-client user network environment, or as a peer computer system in a peer-to-peer (or distributed) network environment. The information handling system 1200 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1200 can be implemented using electronic devices that provide voice, video or data communication. Further, while a single information handling system 1200 is illustrated, the term "system" shall also be taken to include any collection of systems or sub-systems that individually or jointly execute a set, or multiple sets, of instructions to perform one or more computer functions.

The disk drive unit 1216 may include a computer-readable medium 1222 in which one or more sets of instructions 1224 such as software can be embedded. Further, the instructions 1224 may embody one or more of the methods or logic as described herein. In a particular embodiment, the instructions 1224 may reside completely, or at least partially, within the main memory 1204, the static memory 1206, and/or within the processor 1202 during execution by the information handling system 1200. The main memory 1204 and the processor 1202 also may include computer-readable media. The network interface device 1220 can provide connectivity to a network 1226, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1224 or receives and executes instructions 1224 responsive to a propagated signal; so that a device connected to a network 1226 can communicate voice, video or data over the network 1226. Further, the instructions 1224 may be transmitted or received over the network 1226 via the network interface device 1220.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system implemented at a host enterprise for handling information, the system comprising:
   a computer memory;
   a computer processor coupled to the computer memory;
   a registry configured by the computer processor to:
      receive a first source record from a first source enterprise located remotely from the host enterprise, the first source record having a first source identifier;
      generate a first data record based on the first source record, the first data record having a first registry identifier;
      store the first data record at a data store provided by the host enterprise; and
      maintain a first link identifying a relationship between the first registry identifier and the first source identifier; and
   a reference engine configured by the computer processor to:
      determine that a value of a first attribute of a field of the first source record identifies a second source record;
      determine whether the registry includes a second registry identifier associated with a second data record, the second data record generated based on the second source record;
      set an indicator in the registry, the indicator identifying the first data record in response to determining that the registry does not include the second registry identifier, the indicator identifying an unresolved reference; and
      clear the indicator, if the indicator is set, in response to determining that the registry does include the second registry identifier.

2. The system of claim 1, wherein the registry is further configured to maintain a link between the first attribute value and the second data record in response to the determining that the registry includes the second registry identifier.

3. The system of claim 1, further comprising:
   a first data channel coupled to the registry, the first data channel to provide change information indicating a change to the first data record; and
   a first interface process module to identify the change information at the first data channel and to initiate update of the first source record based on the first change information using an Internet protocol.

4. The system of claim 3, wherein the first interface process module is further to:
   determine that the value of the first attribute of the field of the first source record at the first source enterprise has been updated; and
   provide the updated value to the first data channel, the first data channel to provide the updated value to the registry.

5. The system of claim 1, further comprising:
   a channel delivery module;
   a second data channel coupled to the registry, the second data channel to selectively provide change information indicating a change to the first data record based on information provided by the channel delivery module; and
   a second interface process module to identify the change information at the second data channel and to initiate update of the second source record based on the second change information using an Internet protocol.

6. The system of claim 5, wherein the selectively providing the change information comprises:
   providing the change information in response to determining that the second source record is not configured to operate in a strict mode;
   not providing the change information in response to determining that the second source record is configured to operate in the strict mode and in response to determining the indicator is set; and
   providing the change information in response to determining that the second source record is configured to operate in the strict mode and in response to determining the indicator is not set.

7. The system of claim 1, wherein the first data record is associated with a first client enterprise and the data registry is further configured to provide storage at the data store of the second data record associated with a second client enterprise different from the first client enterprise.

8. The system of claim 1, wherein the first data record is further associated with a client enterprise located remotely from the host enterprise, the client enterprise including a client interface process module to provide access by the client enterprise to the first data record and the first source record using an Internet protocol.

9. The system of claim 1, further comprising a matching unit at the host enterprise, the matching unit to:
   receive the second source record; and
   determine if the second source record is to be associated with the first data record.

10. The system of claim 1, further comprising a suggest unit at the host enterprise to provide guidance for configuring the first data record to be stored by the system based on information included at a suggestion database, the information determined based on configuration of data records provided by a plurality of users of the system.

11. A method for handling information comprising:
   receiving, at a registry, at a host enterprise a first source record from a first source enterprise located remotely from the host enterprise, the first source record having a first source identifier;
   generating a first data record based on the first source record, the first data record having a first registry identifier;
   storing the first data record at a data store provided by the host enterprise;
   maintaining a first link identifying a relationship between the first registry identifier and the first source identifier;
   determining at a reference engine that a value of a first attribute of a field of the first source record identifies a second source record;
   determining whether the registry includes a second registry identifier associated with a second data record, the second data record generated based on the second source record;
   setting an indicator in the registry, the indicator identifying the first data record in response to determining that the registry does not include the second registry identifier, the indicator identifying, an unresolved reference; and clearing the indicator, if the indicator is set, in response to determining that the registry does include the second registry identifier.

12. The method of claim 11, further comprising maintaining at the registry a link between the first attribute value and the second data record in response to the determining that the registry includes the second registry identifier.

13. The method of claim 11, further comprising:
providing change information at a first data channel, the change information indicating a change to the first data record; and
receiving the change information at a first interface process module, the first interface process module to initiate update of the first source record based on the change information using an Internet protocol.

14. The method of claim 13, further comprising:
determining at the first interface process module that the value of the first attribute of the field of the first source record at the first source enterprise has been updated; and
providing the updated value to the first data channel, the first data channel to provide the updated value to the registry.

15. The method of claim 11, further comprising:
selectively providing change information at a second data channel coupled to the registry based on information received from a channel delivery module, the change information indicating a change to the first data record; and
receiving the change information at a second interface process module, the second interface process module to initiate update of the second source record at a second source enterprise based on the first change information using an Internet protocol, the second source enterprise located remotely from the host enterprise and the first source enterprise.

16. The method of claim 15, wherein the selectively providing the change information comprises:
providing the change information in response to determining the second source record is not configured to operate in a strict mode;
not providing the change information in response to determining that the second source record is configured to operate in the strict mode and in response to determining the indicator is set; and
providing the change information in response to determining that the second source record is configured to operate in the strict mode and in response to determining the indicator is not set.

17. The method of claim 11, wherein the first data record is associated with a first client enterprise and the data registry is further configured to provide storage at the data store of the second data record associated with a second client enterprise different from the first client enterprise.

18. The method of claim 11, wherein the first data record is further associated with a client enterprise located remotely from the host enterprise, the client enterprise including a client interface process module to provide access by the client enterprise to the first data record and the first source record using an Internet protocol.

19. An information handling system comprising:
a computer memory;
a microprocessor coupled to the computer memory; and
computer-readable instructions stored in the computer memory and executable by the microprocessor to:
receive at a registry at a host enterprise a first source record from a first source enterprise located remotely from the host enterprise, the first source record having a first source identifier;
generate a first data record based on the first source record, the first data record having a first registry identifier;
store the first data record at a data store provided by the host enterprise;
maintain a first link identifying a relationship between the first registry identifier and the first source identifier;
determine at a reference engine a value of a first attribute of a field of the first source record identifies a second source record;
determine whether the registry includes a second registry identifier associated with a second data record, the second data record generated based on the second source record;
set an indicator in the registry identifying the first data record in response to determining that the registry does not include the second registry identifier, the indicator identifying an unresolved reference; and
clear the indicator, if the indicator is set, in response to determining that the registry does include the second registry identifier.

20. The information handling system of claim 19, wherein the registry is further configured to maintain a link between the first attribute value and the second data record in response to the determining that the registry includes the second registry identifier.

* * * * *